(12) United States Patent
Corbefin et al.

(10) Patent No.: US 8,165,732 B2
(45) Date of Patent: Apr. 24, 2012

(54) COMPUTER MAINTENANCE SYSTEM FOR AN AIRCRAFT WITH REMOTE TERMINAL

(75) Inventors: Jean-Philippe Corbefin, Cornebarrieu (FR); Philippe Moreau, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 385 days.

(21) Appl. No.: 12/473,649

(22) Filed: May 28, 2009

(65) Prior Publication Data

US 2009/0319099 A1 Dec. 24, 2009

(30) Foreign Application Priority Data

May 29, 2008 (FR) ..................... 08 53495

(51) Int. Cl.
*G06F 17/00* (2006.01)
*H04L 29/08* (2006.01)
(52) U.S. Cl. ............ 701/3; 701/29.1; 709/219; 709/250
(58) Field of Classification Search .......... 701/3, 29, 701/35; 709/217, 219, 250
See application file for complete search history.

(56) References Cited

U.S. PATENT DOCUMENTS

| | | | |
|---|---|---|---|
| 6,707,821 B1* | 3/2004 | Shaffer et al. | 370/395.4 |
| 7,970,859 B2* | 6/2011 | Weinstock et al. | 709/217 |
| 2003/0135656 A1 | 7/2003 | Schneider et al. | |
| 2004/0042547 A1 | 3/2004 | Coleman | |
| 2004/0083256 A1 | 4/2004 | Chang | |
| 2007/0116110 A1 | 5/2007 | Diamant et al. | |
| 2007/0132771 A1 | 6/2007 | Peer et al. | |
| 2007/0180160 A1 | 8/2007 | Schweig | |
| 2008/0116255 A1 | 5/2008 | Hilbert et al. | |
| 2008/0155124 A1* | 6/2008 | Compton et al. | 709/250 |

FOREIGN PATENT DOCUMENTS

FR 2 907 572 4/2008

OTHER PUBLICATIONS

Yuedong Zhang, et al., "Redar: A Remote Desktop Architecture for the Distributed Virtual Personal Computing", Proceedings of the Fifth International Conference on Grid and Cooperative Computing (GCC'06), IEEE, Computer Society, XP031031008, Oct. 1, 2006, 8 pages.

Tristan Richardson, "The RFB Protocol", RealVNC Ltd., Version 3.8, Jun. 18, 2007, pp. 1-43.

\* cited by examiner

*Primary Examiner* — Ruth Ilan
*Assistant Examiner* — Keith Frisby
(74) *Attorney, Agent, or Firm* — Oblon, Spivak, McClelland, Maier & Neustadt, L.L.P.

(57) ABSTRACT

The present invention relates to a computer maintenance system for an aircraft comprising a server hosting maintenance software and at least one access terminal. The system comprises a KVM switch over IP linked to said server. The terminal is adapted to connect to said switch by means of a TCP/IP connection and hosts a client application. Symmetrically, the switch hosts a server application, said applications being suitable for implementing a protocol for remotely accessing a video frame buffer. Each video frame is transmitted from the server application to the client application in the form of bitmap image data, uncompressed or else compressed by a lossless compression algorithm.

9 Claims, 3 Drawing Sheets

COMPUTER MAINTENANCE SYSTEM FOR AN AIRCRAFT WITH REMOTE TERMINAL

TECHNICAL FIELD

The present invention relates generally to the field of computer systems and more particularly to that of computer maintenance systems on board an aircraft.

STATE OF THE PRIOR ART

Conventionally, the maintenance of an aircraft is performed on the ground by maintenance technicians using paper documentation.

This documentation used to take the form of maintenance and repair manuals or binders. It exhaustively described the preventive maintenance procedures, for detecting and repairing failures that can affect any equipment of the aircraft.

Similarly, notes from the pilots were entered in a log book in paper form. The maintenance technicians then used this log book on stopovers for maintenance requirements.

More recently, with the trend to reduce or even completely eliminate paper from the cockpit, such documents have been replaced by onboard computer applications.

The maintenance technician can now consult the log book, follow up on flight incidents, launch test procedures on certain equipment or remotely control the electrical disconnection of the equipment, update equipment by uploading new software versions, etc., and all thanks to a centralized computer maintenance system, called CMS (centralized maintenance system). More specifically, the technician uses an onboard terminal called OMT (onboard maintenance terminal) permanently installed in the cockpit to access the plurality of software hosted by the CMS system enabling the technician to carry out the various maintenance operations.

However, this maintenance system is particularly unsuitable when the test operations require a direct intervention on the part of the technician on an item of equipment (LRU), such as a manipulation or a replacement. The technician is then often forced to make multiple round trips between the equipment to be tested and the cockpit, hence a significant loss of time and a potential source of errors.

A first solution to this problem would be to use a portable terminal (or a PDA) linked to the CMS system using a wired or even wireless network. Such a solution is, however, excluded for reasons of security. In practice, the CMS system and the OMT terminal are situated in a secured area of the aircraft (avionics area) and transmitting data from an unsecured area (open area) to the avionics area cannot be envisaged. The onboard network is generally partitioned into a first subnetwork belonging to a secured area (avionics subnetwork), and a second subnetwork belonging to an unsecured area (open subnetwork). The links between the two subnetworks are mandatorily unidirectional, directed from the avionics subnetwork to the open subnetwork.

The problem underlying the invention is consequently how to implement a computer system enabling the maintenance technician to access the CMS system at the very same time that he is intervening directly on equipment to be tested situated in the open area, while conforming to the security constraints of the avionics area.

EXPLANATION OF THE INVENTION

The present invention is defined by a computer maintenance system of an aircraft comprising a server hosting maintenance software and at least one access terminal. This system comprises a KVM switch over IP linked to said server, said terminal being adapted to connect to said switch by means of a TCP/IP connection, the terminal comprising a client application and said switch comprising a server application, suitable for implementing a protocol for remotely accessing a video frame buffer (RFB), each video frame being transmitted from the server application to the client application in the form of bitmap image data, uncompressed or else compressed by a lossless compression algorithm.

Advantageously, each video frame is transmitted independently, without reference to a preceding or following frame.

More advantageously, the server application is adapted to encrypt said data prior to its transmission over the TCP/IP connection.

The server application transmits said video frames with a predetermined constant frequency.

According to a first variant, the server application is adapted to embed in each video frame a time indication supplied by a local clock of the switch.

According to a second variant, the server application is adapted to time-stamp said video frames prior to their transmission over said connection.

Said switch can comprise video acquisition means adapted to recover video frames in a graphics card (GSU) of said server and store them in a local frame buffer.

Advantageously, the client application is adapted to encode a key code when a key of the keyboard of the terminal is pressed, and to transmit the duly obtained code to said switch which decodes it and converts it into a serial signal before transmitting it to said server.

Similarly, the client application can be adapted to encode an action of the mouse of the terminal, when the latter is clicked or moved, and to transmit the thus encoded action to said switch which decodes it and converts it into a serial signal before transmitting it to said server.

Finally, the invention also relates to an aircraft comprising a maintenance system as explained hereinabove. Said aircraft is partitioned into a secured area, called avionics area, and an unsecured area, called open area. The server and the switch are installed in the avionics area, said switch being linked elsewhere to a LAN situated in the open area, the LAN comprising a plurality of sockets arranged close to equipment fitted with built-in test modules, the terminal being able to be connected to any one of said sockets to set up a TCP/IP connection with the switch.

BRIEF DESCRIPTION OF THE DRAWINGS

Other features and benefits of the invention will become apparent from reading about a preferred embodiment of the invention, given with reference to the appended figures in which.

DETAILED EXPLANATION OF PARTICULAR EMBODIMENTS

The main idea on which the invention is based is to use a KVM (keyboard video mouse) switch over IP (KVM switch over IP) of a particular type, for transferring the display and control functions of the OMT terminal to a remote terminal using a TCP/IP link.

It will be recalled that a KVM switch can generally be used to share screen, keyboard and mouse between several computers. More specifically, such a switch can be used to select, manually, or electronically using a combination of keyboard keys or a video-embedded menu, the computer with which to work. Conversely, a reverse KVM switch (or KVM splitter) can be used to share a computer between several work stations, each comprising a screen, a keyboard and a mouse.

A KVM switch over IP, unlike a conventional KVM switch, requires no screen, keyboard and mouse to be connected directly to the switch. Thanks to a remote computer linked to the LAN or to the Internet, a user can connect to the switch via a TCP/IP link. The video signal and the keyboard and mouse control signals are conveyed by IP packets between the remote computer and the switch. The user can thus remotely control and display the video of one (single port KVM switch) or several (multiport KVM switch) computers connected to the KVM switch over IP.

The interchanges between the computer and the KVM switch are conducted by means of a thin client, generally a simple web browser, installed on the remote computer, and a server installed on the KVM switch.

The KVM switches over IP that are available on the market (COTS) use a data compression algorithm such as, for example, MPEG-4, enabling them to reduce the bit rate of the video signal over the TCP/IP connection which generally offers a relatively low bandwidth. Furthermore, an encryption of the data, for example by means of the SSL (secure socket layer) protocol, can be provided so as to guarantee a certain level of security on transferring the data. It should, however, be noted that this level of security is insufficient to satisfy an aeronautical certification.

Unlike the known KVM switches, the maintenance system according to the invention uses a KVM switch over IP implementing an RFB (remote frame buffer) protocol that works directly on bitmap image data or else on data compressed by a lossless compression algorithm. It will be recalled that the RFB protocol allows remote access to a graphical user interface (GUI). It implements a client installed on the user's computer and a server on the side of the machine where the video frame buffer (frame buffer) is located. A description of the RFB protocol can, for example, be found in the article by T. Richardson entitled "The RFB protocol", available at the address www.realvnc.com.

Figure 1:
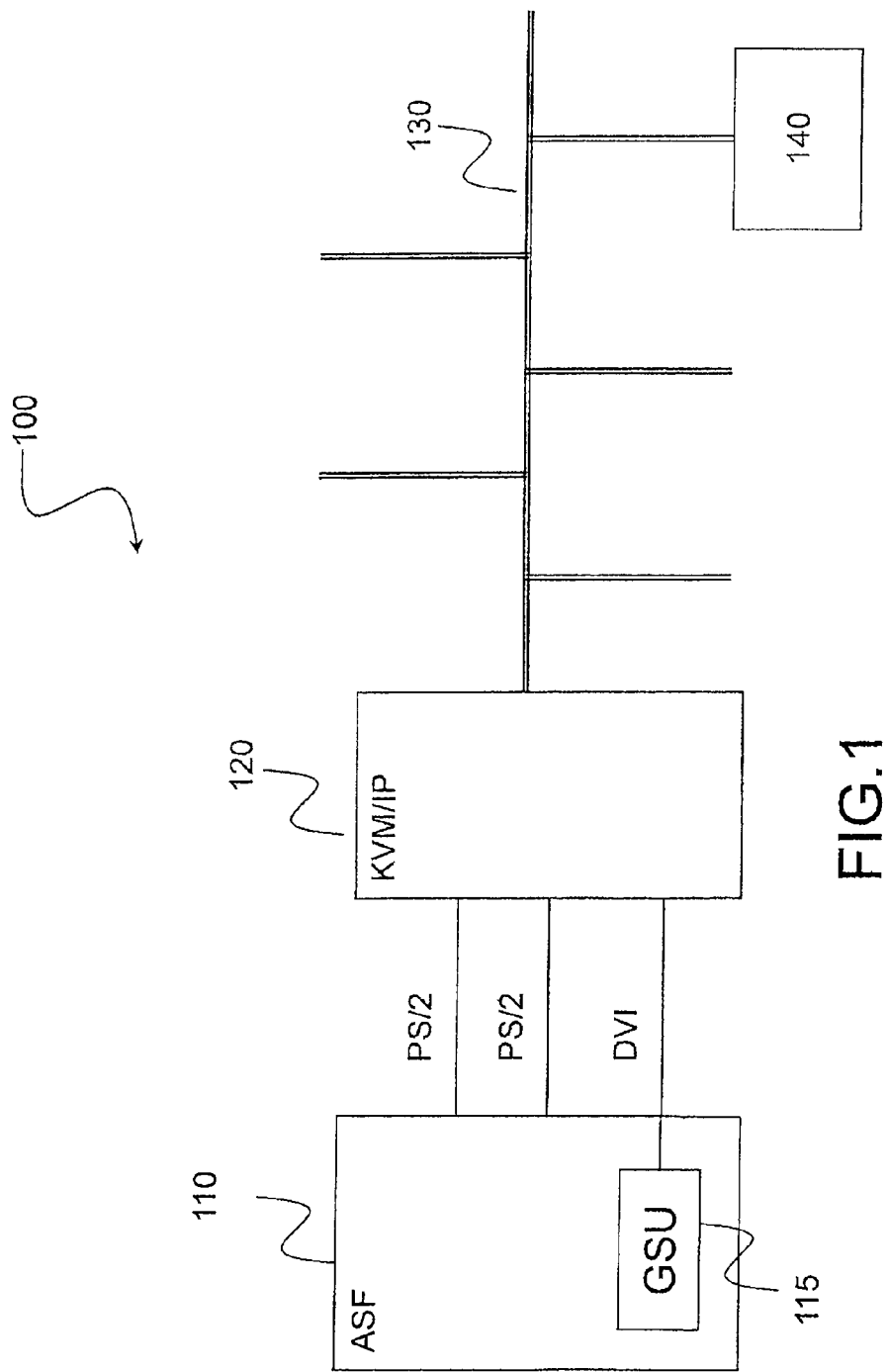
FIG. 1 diagrammatically illustrates the hardware architecture of a computer maintenance system of an aircraft, according to an embodiment of the invention.

FIG. 1 represents the general architecture of a computer maintenance system 100 according to an embodiment of the invention.

This system comprises a server of the CMS system, 110, called ASF (application server function) hosting aircraft maintenance software. This server comprises a graphics card, 115, or GSU (graphic server unit), containing a video frame buffer, also called video buffer (not represented).

The system 100 also comprises a KVM switch over IP, 120, linked to the graphics card of the ASF server by means of a DVI connector and to its keyboard/mouse serial interfaces by means of PS/2 or USB connectors, in a manner known per se.

The KVM switch, 120, is linked to an onboard LAN, 130, for example an Ethernet network situated in the open area of the aircraft. The Ethernet network can comprise a plurality of RJ45 sockets distributed at strategic points of the aircraft, ideally close to the main equipment to be tested (LRUs). The equipments to be tested comprise built-in test modules, or built-in test equipments (BITE), linked to the computer maintenance system by means of the avionics network (not represented).

The maintenance operator can connect a remote computer, 140, typically a portable computer (laptop, notebook) or a personal assistant (PDA, pocket PC, tablet PC) to an RJ45 socket close to the equipment that is the subject of the maintenance. By connecting to the IP address of the KVM switch 120, he can access all the maintenance tools hosted on the server 110 and, in particular, those relating to the equipment concerned. He can thus launch a test procedure, remotely activate a circuit breaker to electrically isolate this equipment, replace it, upload a new software version, etc.

Figure 2:
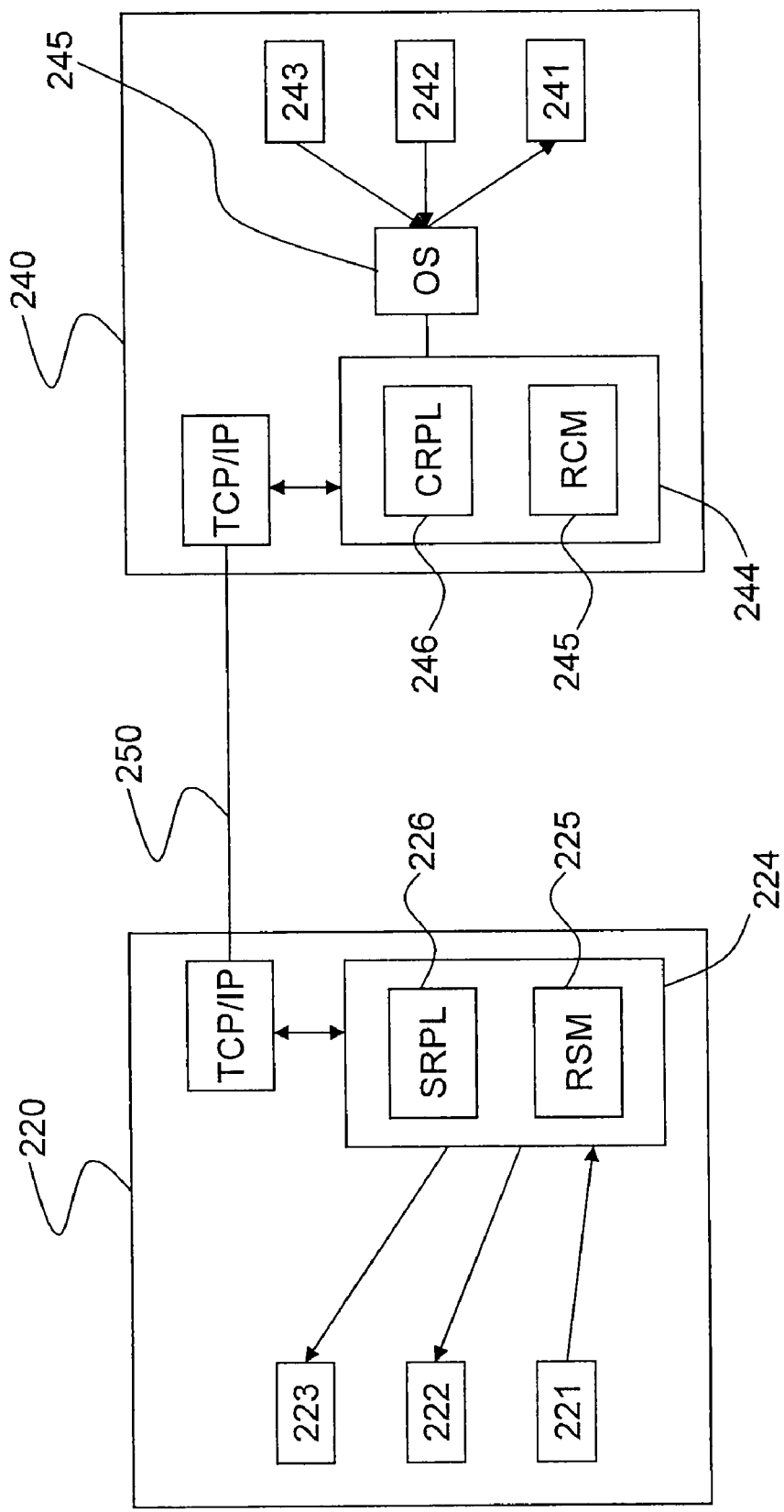
FIG. 2 diagrammatically illustrates the software architecture of the KVM switch and of the remote terminal forming part of the system of FIG. 1.

FIG. 2 diagrammatically illustrates the software architecture of the KVM switch and that of the remote terminal.

The remote terminal, 240, comprises a graphics card driver (video driver) 241, a keyboard driver 242 and a mouse driver 243, respectively managing the display on the screen, and the keyboard and mouse connected to said terminal, under the overall control of the operating system, 245.

A client application 244 (remote display client application) is hosted by the terminal 240. This application receives keyboard and mouse actions for the drivers 242 and 243, encodes these actions and transfers them via the TCP/IP connection 250 to the KVM switch 220. Also, the client application 244 receives from the KVM switch via this same connection RFB protocol data units (PDUs), and decodes them into bitmap data that it stores in the frame buffer of the terminal 240. The graphics card driver 241 displays on the screen of the terminal the content of the frame buffer thus filled.

The client application 244 is advantageously signed by a private key of the aircraft manufacturer by means of a public key infrastructure (PKI). This signature guarantees the integrity and the authenticity of the application concerned.

The client application 244 notably comprises a protocol conversion layer (client remote protocol layer), 246, able on the one hand to receive the IP packets, and extract from them the PDUs of the RFB protocol, and, on the other hand, to encode the keyboard and mouse actions to transmit them in IP packet form over the connection 250. The management of the RFB protocol, the encoding of the keyboard and mouse actions, and the filling of the frame buffer are supervised by a control module (remote client manager), 245. The client application can also include additional modules such as, for example, a module for controlling the security of the transfer of the data (security handler) between the switch and the terminal, as detailed below.

Symmetrically, the KVM switch 220 comprises a video acquisition driver 221, a keyboard driver 222 and a mouse driver 223. The video acquisition driver recovers the frames in the video buffer of the graphics card GSU and stores them in a local frame buffer (not represented) of the switch. The keyboard and mouse drivers respectively receive the keyboard and mouse actions transmitted in IP packet form over the connection 250, after decoding by the server application 224 (remote display server application). The server application 224 comprises a protocol conversion layer, 226, responsible for converting the content of the local frame buffer into PDUs of the RFB protocol in IP packet form, packets that are then transmitted over the connection 250. The management of the RFB protocol, the decoding of the keyboard and mouse actions, and the conversion of frames are controlled by a control module (remote server manager), 225.

Figure 3:
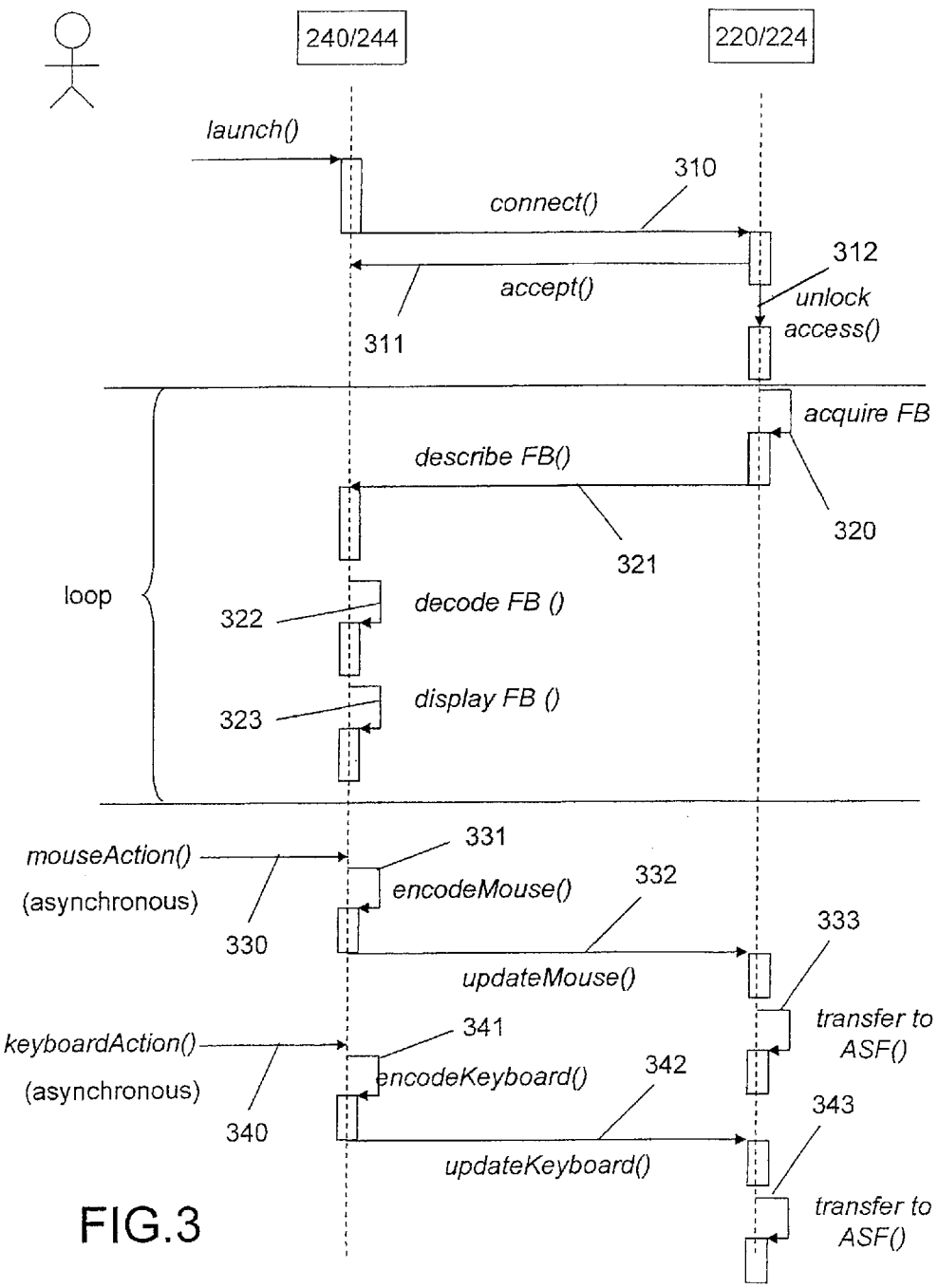
FIG. 3 diagrammatically illustrates an example of a session between the KVM switch and the remote terminal, both represented in FIG. 2.

FIG. 3 illustrates an example of a session between the remote terminal 240 and the KVM switch over IP, 220, more precisely between the client application 244 hosted by the terminal and the server application 224 hosted by the switch.

The request to open the session at 310 presupposes that the maintenance operator has previously supplied his identifier and his password to the terminal 240. If these are recognized as valid by the switch 220, the opening of the session is accepted in 311, and access to the mouse and keyboard drivers is authorized in 312.

The interchanges between the applications 224 and 244 are conducted in a synchronous or asynchronous mode, depending on whether they concern the video display or keyboard/mouse actions.

The video frames are acquired by the KVM switch in 320 with a predetermined frequency, for example 20 Hz. Each frame is independently converted into RFB protocol PDUs, and the latter are then transmitted in 321 to the terminal. These PDUs are decoded in 322 so as to refresh the content of the frame buffer of the terminal, the content being displayed in 323.

It is essential to note that the video data transported in the RFB protocol PDUs here comprises bitmap image data, possibly compressed by means of a lossless data compression algorithm, such as the Huffman algorithm, arithmetical coding or else the LZ77, LZW algorithms. Thus, any corruption of the transmitted video data will be able to be perceived by the maintenance operator. On the other hand, if lossy data compression algorithms were to be used, such as MPEG-2 or MPEG-4, a corruption of data could be reflected, for example, in a slight loss of resolution that is difficult to detect by the naked eye.

Advantageously, each frame is transmitted in the form of bitmap image data coded without reference to a preceding or following frame. In particular, any inter-frame differential coding is proscribed. This measure provides a way of warding off an attack relating to the refreshing of the frames.

In any case, the image data can also be the subject of an encryption, for example by means of an asymmetrical key ciphering algorithm.

The use of bitmap image data, possibly compressed and encrypted, as stated above, provides a way of satisfying the safety and security requirements posed by aeronautical certification, namely a DAL C level when it comes to safety and an EAL 4+ level when it comes to security. More specifically, in the context of the present invention, only the software of the drivers 222, 223 and, where appropriate, of the driver 221 would need to satisfy this certification.

The safety requirement aims to prevent any corruption or loss of data that could result from a hardware failure or a software error (bug). It therefore deals with the reliability and the stability of the maintenance system.

The security requirement aims essentially at safeguarding against malicious intrusions or unauthorized control take-overs.

The system according to the invention satisfies the abovementioned two requirements in as much as an integrity fault affecting the bitmap image data will be detectable by the operator. It should be noted that this corruption will be all the more easy to detect if a lossless compression algorithm has been applied. In practice, in this case, the visual impact of the corruption is generally greater than for a simple bitmap image.

Advantageously, in order to facilitate the detection of any corruption, any frame loss or any excessive latency delay, provision may be made to perform a time-stamping of the frames before transmitting them over the connection 250. On receipt by the terminal, the security module (security handler) checks the correct chronology of the frame sequence. A loss or an incorrect frame order provokes an alert on the terminal. Moreover, the time indication contained in the time-stamp attached to the frame can be used to drive a clock of the terminal, advantageously embedded on the screen. Alternatively, a time indication, given by a clock of the switch, can be embedded by the server application 224 at the level of the frame buffer. A stoppage or an interruption of the transmission of frames reflected by a stoppage or jump of the clock can be detected by the operator.

Unlike the video data, the keyboard/mouse actions are transmitted using an asynchronous mode.

When the operator acts on the mouse (relative movement, click) in 330, the type of action acquired and, where appropriate, the parameter(s) associated with this action, are coded in 331 by the layer 246 of the application 244 then transmitted in 332 over the connection 250 by means of one or more IP packets. On receipt, the information is decoded and converted into a serial signal which is transmitted to the server 110 via a PS/2 or USB link.

Similarly, when the operator presses a key of the keyboard in 340, the key code stored in the keyboard buffer is encoded in 341 by the layer 246 then transmitted in 342 over the connection 250 by means of an IP packet. On receipt, the key code is decoded then converted into a serial signal which is transmitted to the server 110 via a PS/2 or USB link.

Given that the video frames are transmitted every 20 ms, the operator perceives in real time the result of his action on the keyboard or the mouse. In case of attack, failure or latency, the incident will be immediately perceptible by the operator.

Advantageously, the keyboard/mouse actions are the subject of an encryption, in addition to the encoding of the transmission protocol. The aim of this encryption is to enhance the resistance of the keyboard/mouse controls to any attacks.

By developing and implementing drivers 223, 222 and, where appropriate, 221, that meet the abovementioned certification constraints, it can be demonstrated that a take-over of control of the server 110 is then impossible.

The invention claimed is:

1. A computer maintenance system for an aircraft including a server hosting maintenance software and at least one access terminal, comprising:
    a keyboard video mouse switch over IP, hereinafter referred to as KVM switch, linked to the server, wherein the terminal is adapted to connect to the switch by a TCP/IP connection,
    the terminal includes a client application,
    the switch includes a server application that implements a protocol to remotely access a video frame buffer, and
    each video frame is independently transmitted from the server application to the client application in the form of bitmap image data coded without reference to a preceding or a following frame, uncompressed or else compressed by a lossless compression algorithm.

2. The computer maintenance system according to claim 1, wherein the server application is adapted to encrypt the data prior to its transmission over the TCP/IP connection.

3. The computer maintenance system according to claim 1, wherein the server application transmits the video frames with a predetermined constant frequency.

4. The computer maintenance system according to claim 1, wherein the server application is adapted to embed in each video frame a time indication supplied by a local clock of the switch.

5. The computer maintenance system according to claim 1, wherein the server application is adapted to time-stamp the video frames prior to their transmission over the connection.

6. The computer maintenance system according to claim 1, wherein the switch includes a video acquisition unit adapted to recover video frames in a graphics card of the server and store them in a local frame buffer.

7. The computer maintenance system according to claim 1, wherein the client application is adapted to encode a key code when a key of the keyboard of the terminal is pressed, and to transmit the duly obtained code to the switch, which decodes it and converts it into a serial signal before transmitting it to the server.

8. The computer maintenance system according to claim 1, wherein the client application is adapted to encode an action of the mouse of the terminal, when the latter is clicked or moved, and to transmit the duly encoded action to the switch, which decodes it and converts it into a serial signal before transmitting it to the server.

9. An aircraft comprising the computer maintenance system according to claim 1, the aircraft being partitioned into a secured area, called avionics area, and an unsecured area, called open area, wherein the server and the switch are installed in the avionics area, the switch is linked elsewhere to a Local Area Network (LAN) situated in the open area, the LAN includes a plurality of sockets arranged close to equipment fitted with built-in test modules, and the terminal is able to be connected to any one of the sockets to set up a TCP/IP connection with the switch.

* * * * *